(12) United States Patent
Kourogi et al.

(10) Patent No.: US 8,758,275 B2
(45) Date of Patent: Jun. 24, 2014

(54) MOVING BODY POSTURE ANGLE PROCESSING DEVICE

(75) Inventors: Masakatsu Kourogi, Tsukuba (JP); Takeshi Kurata, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 528 days.

(21) Appl. No.: 13/001,483

(22) PCT Filed: Jul. 2, 2009

(86) PCT No.: PCT/JP2009/062145
§ 371 (c)(1),
(2), (4) Date: Dec. 27, 2010

(87) PCT Pub. No.: WO2010/001970
PCT Pub. Date: Jan. 7, 2010

(65) Prior Publication Data
US 2011/0105957 A1 May 5, 2011

(30) Foreign Application Priority Data
Jul. 2, 2008 (JP) .................. 2008-173970

(51) Int. Cl.
*A61B 5/103* (2006.01)
*A61B 5/117* (2006.01)
*G01C 9/00* (2006.01)
*G01C 17/00* (2006.01)
*G01C 19/00* (2013.01)

(52) U.S. Cl.
USPC ............ 600/595; 702/150; 702/151; 702/153

(58) Field of Classification Search
USPC .................. 600/547, 587, 594, 595
See application file for complete search history.

(56) References Cited

U.S. PATENT DOCUMENTS 6,415,229 B1 7/2002 Diekhans
6,480,148 B1 * 11/2002 Wilson et al. ............ 342/357.32
(Continued)

FOREIGN PATENT DOCUMENTS

JP 05-306936 A 11/1993
JP 08-068652 3/1996
(Continued)

OTHER PUBLICATIONS

Office Action mailed Jan. 18, 2013 in co-pending U.S. Appl. No. 13/001,275.

(Continued)

*Primary Examiner* — Max Hindenburg
*Assistant Examiner* — Adam Eiseman
(74) *Attorney, Agent, or Firm* — Renner, Otto, Boisselle & Sklar, LLP

(57) ABSTRACT

A moving body attitude angle processing apparatus capable of reducing cumulative errors in continuously measuring the attitude angle of a moving body is provided. The moving body attitude angle processing apparatus estimates the attitude angle of a moving body in accordance with outputs from an acceleration sensor, a magnetic sensor, and a gyro sensor that are mounted to the moving body, and outputs the attitude angle thus estimated. The moving body attitude angle processing apparatus includes: a gyro sensor that outputs an angular velocity vector; an acceleration sensor that outputs an acceleration vector; a magnetic sensor that outputs a magnetic field vector; a movement state determining device that determines a movement state of a moving body in accordance with an output from the acceleration sensor; and a gyro-sensor zero-point output estimating device that, when the movement state determining device determines the movement state to have been detected as a stationary state of the moving body, carries out a process of estimating a zero-point output of the gyro sensor in accordance with the output from the acceleration sensor, an output from the magnetic sensor, and an output from the gyro sensor.

4 Claims, 4 Drawing Sheets

(56) References Cited

U.S. PATENT DOCUMENTS

| | | |
|---|---|---|
| 6,636,826 B1 | 10/2003 | Abe et al. |
| 7,089,148 B1* | 8/2006 | Bachmann et al. ............ 702/151 |
| 7,363,147 B2 | 4/2008 | Esaki et al. |
| 2002/0143491 A1 | 10/2002 | Scherzinger |
| 2003/0018430 A1 | 1/2003 | Ladetto et al. |
| 2005/0240347 A1* | 10/2005 | Yang ............................ 701/220 |
| 2006/0247854 A1 | 11/2006 | Esaki et al. |
| 2007/0032951 A1* | 2/2007 | Tanenhaus et al. ............ 701/220 |
| 2007/0250261 A1* | 10/2007 | Soehren ........................ 701/207 |
| 2008/0004796 A1 | 1/2008 | Schott et al. |
| 2008/0221818 A1 | 9/2008 | Tan et al. |
| 2008/0262728 A1 | 10/2008 | Lokshin et al. |
| 2009/0015399 A1* | 1/2009 | Burneske et al. ........ 340/539.13 |
| 2010/0198442 A1 | 8/2010 | Appelman et al. |

FOREIGN PATENT DOCUMENTS

| | | |
|---|---|---|
| JP | 08-285621 | 11/1996 |
| JP | 09-005093 | 1/1997 |
| JP | 11-211479 | 8/1999 |
| JP | 3038452 | 3/2000 |
| JP | 2000-180171 | 6/2000 |
| JP | 2002-213979 A | 7/2002 |
| JP | 2005-114537 A | 4/2005 |
| JP | 2006-329972 | 12/2006 |
| WO | WO 9849577 A2 * | 11/1998 |
| WO | 2005/109215 A2 | 11/2005 |

OTHER PUBLICATIONS

Co-pending U.S. Appl. No. 13/001,275, filed Dec. 23, 2010.
International Search Report for International Application No. PCT/JP2009/062142 mailed Sep. 29, 2009.
Form PCT/ISA/237 for international Application No. PCT/JP2009/062142 dated Sep. 29, 2009.
International Search Report for corresponding International Application No. PCT/JP2009/062145 mailed Sep. 29, 2009.
Form PCT/ISA/237 for corresponding International Application No. PCT/JP2009/062145 dated Sep. 29, 2009.
Faruqi, F., "Non-linear Mathematical Model for Integrated Global Positioning/Inertial Navigation Systems", Applied Mathematics and Computation 115(2000), pp. 191-212.
Office Action mailed on May 13, 2013 for related U.S. Appl. No. 13/001,275.
Office Action mailed on Sep. 17, 2013 for related U.S. Appl. No. 13/001,275.
Office Action dated Feb. 24, 2014 for co-pending U.S. Appl. No. 13/001,275.
Advisory Action dated May 9, 2014 for co-pending U.S. Appl. No. 13/001,275.

* cited by examiner

MOVING BODY POSTURE ANGLE PROCESSING DEVICE

TECHNICAL FIELD

The present invention relates to a moving body attitude angle processing apparatus capable of reducing cumulative errors in continuously measuring the attitude angle of a moving body.

BACKGROUND ART

A technique for acquiring the state of a person (moving body) through a body-worn system is essential to the realization of an intellectual interface with a computer through a grasp of context information on the person. Such a technique is expected to be developed to have many applications in pedestrian navigation, grasping of the situation of workers during remote operation assistance, guiding of visitors thorough exhibitions in museums or large-scale exhibition facilities, etc.

For example, an attitude angle processing apparatus that is taken along by a person to be able to give accurate information on the attitude angle of that person is worn by an object to be measured (a small-sized device such as a cellular phone or a PDA, a human body, etc.) to acquire the attitude angle of the object to be measured as a signal from a group of small-sized, lightweight, and inexpensive sensors.

Conventionally, a technique for acquiring an absolute attitude angle by using either a magnetic sensor and an angle-of-inclination sensor or a gravitational acceleration sensor has been known. Further, a technique for measuring a relative change in attitude with respect to an absolute reference attitude angle by using an angular velocity sensor has been known. An attempt has been made to combine these sensors to more accurately and robustly measure the absolute attitude angle of an object to be measured.

CITATION LIST

Patent Literature 1
Japanese Patent No. 3038452
Patent Literature 2
Japanese Patent Application Publication, Tokukaihei, No. 11-211479 A

SUMMARY OF INVENTION

Technical Problem

The method for measuring a current absolute attitude angle in accordance with a geomagnetic vector estimated using a magnetic sensor has difficulty in measuring reliable geomagnetism, especially in an indoor environment where there exit magnetic field disturbances due to various electronic devices and building structures, and as such, does not stably function correctly in a wide range of environments.

Further, the method for measuring an attitude angle by using a gyro sensor and an acceleration sensor, which estimates an attitude angle by integrating angular velocity vectors measured by the gyro sensor and acceleration vectors measured by the acceleration sensor and thereby giving point-by-point updates to an absolute attitude angle serving as a reference, has difficulty in keeping on acquiring absolute attitude angles over a long period of time, due to problems such as drift components contained in output from the gyro sensor.

Gyro sensors and acceleration sensors for use in an inertial measurement unit (IMU) that is mounted in an aircraft or the like can measure a relative change in attitude angle with a very high degree of accuracy with respect to an absolute attitude angle serving as a reference but, due to their size and weight and for economical reasons, have difficulty in being mounted to small-sized devices or human bodies.

In constituting a self-contained navigation system for use in a pedestrian navigation system, it is generally difficult, from the perspective of price and weight, to use high-accuracy and high-price gyro sensors, and it is therefore usual to use low-price MEMS (microelectromechanical systems) gyro sensor devices.

However, the zero-point output of an angular velocity by an MEMS gyro sensor device (angular velocity output of the sensor at rest) contains an offset component, which is known to vary slowly over a long period of time. It is possible to partly estimate the zero-point output of a gyro sensor in accordance with the temperature of the gyro sensor; however, in most cases, it is necessary to capture a long-term variation to correct its offset component.

In cases where a self-contained navigation system cannot correct such variations, it becomes unable to keep on estimating an azimuth of movement correctly over a long period of time and, therefore, ends up with enormous errors in positioning.

The present invention has been made in order to solve such problems, and it is an object of the present invention to provide a moving body attitude angle processing apparatus capable of reducing cumulative errors in continuously measuring the attitude angle of a moving body. Specifically, it is an object of the present invention to provide a moving body attitude angle processing apparatus including means for estimating an offset component contained in the zero-point output of an angular velocity by an MEMS gyro sensor device.

Solution to Problem

In order to attain such an object as stated above, the present invention configures a moving body attitude angle processing apparatus based on such a concept as follows: Because measurement results obtained in an interval of movement over a distance longer than or equal to a predetermined threshold value are not those obtained at the same point but those obtained in moment-to-moment varying conditions and environments, errors in observation data are expected to be closer in character to a quality of white noise whose mean vector is zero. For this reason, a series of measurement results that are obtained during movement is considered as data more appropriate in character to be input into a Kalman filter, a particle filter, etc.

In view of this, the present invention makes it possible to carry out a process of estimation of the attitude angle of a moving body more appropriately by detecting movements to discriminate between two states, namely a state where the moving body is moving and a state where the moving body is at rest, and by differently dealing with measurement results obtained in the respective states.

Specifically, a device for estimating an offset component contained in the zero-point output of an angular velocity by a gyro sensor is constituted by a combination of an acceleration sensor (three-axis) that is used to detect an azimuth of gravitational force and a motion, a gyro sensor (three-axis) that measures an angular velocity, a magnetic sensor (three-axis) that measures geomagnetism and an ambient magnetic field, and means for detecting a state of movement with these sensors, and a process of estimation of an attitude angle is carried out by utilizing an estimated offset component.

For this purpose, an extended Kalman filter having an offset value of zero-point output of angular velocity by a gyro sensor (three-axis), a gravitational acceleration vector (three-dimensional), an ambient magnetic vector (three-dimensional), and an angular velocity (three-dimensional) as its state vector is configured to be used as a gyro-sensor zero-point output estimating device.

Specifically, in a first aspect of the present invention, a moving body attitude angle processing apparatus for estimating an attitude angle of a moving body in accordance with outputs from an acceleration sensor, a magnetic sensor, and a gyro sensor that are mounted to the moving body, and for outputting the attitude angle thus estimated includes: a gyro sensor that outputs an angular velocity vector; an acceleration sensor that outputs an acceleration vector; a magnetic sensor that outputs a magnetic field vector; a movement state determining device that determines a movement state of a moving body in accordance with an output from the acceleration sensor; and a gyro-sensor zero-point output estimating device that, when the movement state determining device determines the movement state to have been detected as a stationary state of the moving body, carries out a process of estimating a zero-point output of the gyro sensor in accordance with the output from the acceleration sensor, an output from the magnetic sensor, and an output from the gyro sensor, a zero point of the gyro sensor being corrected by utilizing an output from the gyro-sensor zero-point output estimating device.

Further, in this case, the moving body attitude angle processing apparatus is characterized in that in cases where an attitude angle estimating device that estimates an attitude angle in accordance with the outputs from the acceleration sensor, the magnetic sensor, and the gyro sensor carries out an process of estimation of an attitude angle of the moving body, an output of estimation of the attitude angle of the moving body is corrected in accordance with the output from the gyro-sensor zero-point output estimating device.

Specifically, in a second aspect of the present invention, a moving body attitude angle processing apparatus for estimating an attitude angle of a moving body in accordance with outputs from an acceleration sensor, a magnetic sensor, and a gyro sensor that are mounted to the moving body, and for outputting the attitude angle thus estimated includes: a gyro sensor that outputs an angular velocity vector; an acceleration sensor that outputs an acceleration vector; a magnetic sensor that outputs a magnetic field vector; a movement state determining device that determines a movement state of a moving body in accordance with an output from the acceleration sensor and an output from the gyro sensor; and a gyro-sensor zero-point output estimating device that, when the movement state determining device determines the movement state to have been detected as a stationary state of the moving body, carries out a process of estimating a zero-point output of the gyro sensor in accordance with the output from the acceleration sensor, an output from the magnetic sensor, and the output from the gyro sensor, a zero point of the gyro sensor being corrected by utilizing an output from the gyro-sensor zero-point output estimating device.

Further, in this case, the moving body attitude angle processing apparatus is characterized in that in cases where an attitude angle estimating device that estimates an attitude angle in accordance with the outputs from the acceleration sensor, the magnetic sensor, and the gyro sensor carries out an process of estimation of an attitude angle of the moving body, an output of estimation of the attitude angle of the moving body is corrected in accordance with the output from the gyro-sensor zero-point output estimating device.

Advantageous Effects of Invention

In carrying out a process of estimation of the attitude angle of a moving body, a moving body attitude angle processing apparatus thus configured according to the present invention corrects the zero point of the gyro sensor by detecting the presence or absence of a movement of the moving body, i.e., in accordance with the presence or absence of a movement or, specifically, by detecting the moving body's standing still; or carries out data processing in such a way as to determine whether an output of estimation of the attitude angel of the moving body is right or wrong, correct the output of the process of estimation of the attitude angle, and output the output thus corrected.

In cases where it is determined that a person wearing the apparatus is standing still on the spot, an ambient magnetic field that is measured by the magnetic sensor can be deemed to be constant at the same point. That is, when the movement state determining device outputs a TRUE signal, it becomes possible to estimate an offset value of zero-point output, i.e., a state vector of the extended Kalman filter by utilizing, as a result of observation of an ambient magnetic field, the magnetic vector that is measured by the magnetic sensor.

The movement state determining device here can be configured as a device to detect a stationary state by using a statistics value such as a variance in magnitude of a variation in output of the acceleration sensor alone or of the acceleration sensor and the gyro sensor. This makes it possible to configure an attitude angle estimation process device by configuring a gyro-sensor zero-point output device without adding any other particular measuring means.

Further, the extended Kalman filter accurately estimates an offset value of zero-point output of the gyro sensor (three-axis), thereby allowing a reduction of estimate errors in azimuth of movement calculated as a result of integration from the angular velocity output of the gyro sensor. This makes it possible to realize a pedestrian self-contained navigation system small in number of positioning errors in the long term.

BRIEF DESCRIPTION OF DRAWINGS

FIG. 1 is a block diagram showing main components of a moving body attitude angle processing apparatus according to the present invention.

FIG. 2 is a block diagram showing a configuration of a moving body attitude angle processing apparatus according to the present invention.

FIG. 3 is a block diagram showing a configuration of another moving body attitude angle processing apparatus according to the present invention.

FIG. 4 is a block diagram showing a configuration of another moving body attitude angle processing apparatus according to the present invention.

DESCRIPTION OF EMBODIMENTS

Figure 1:
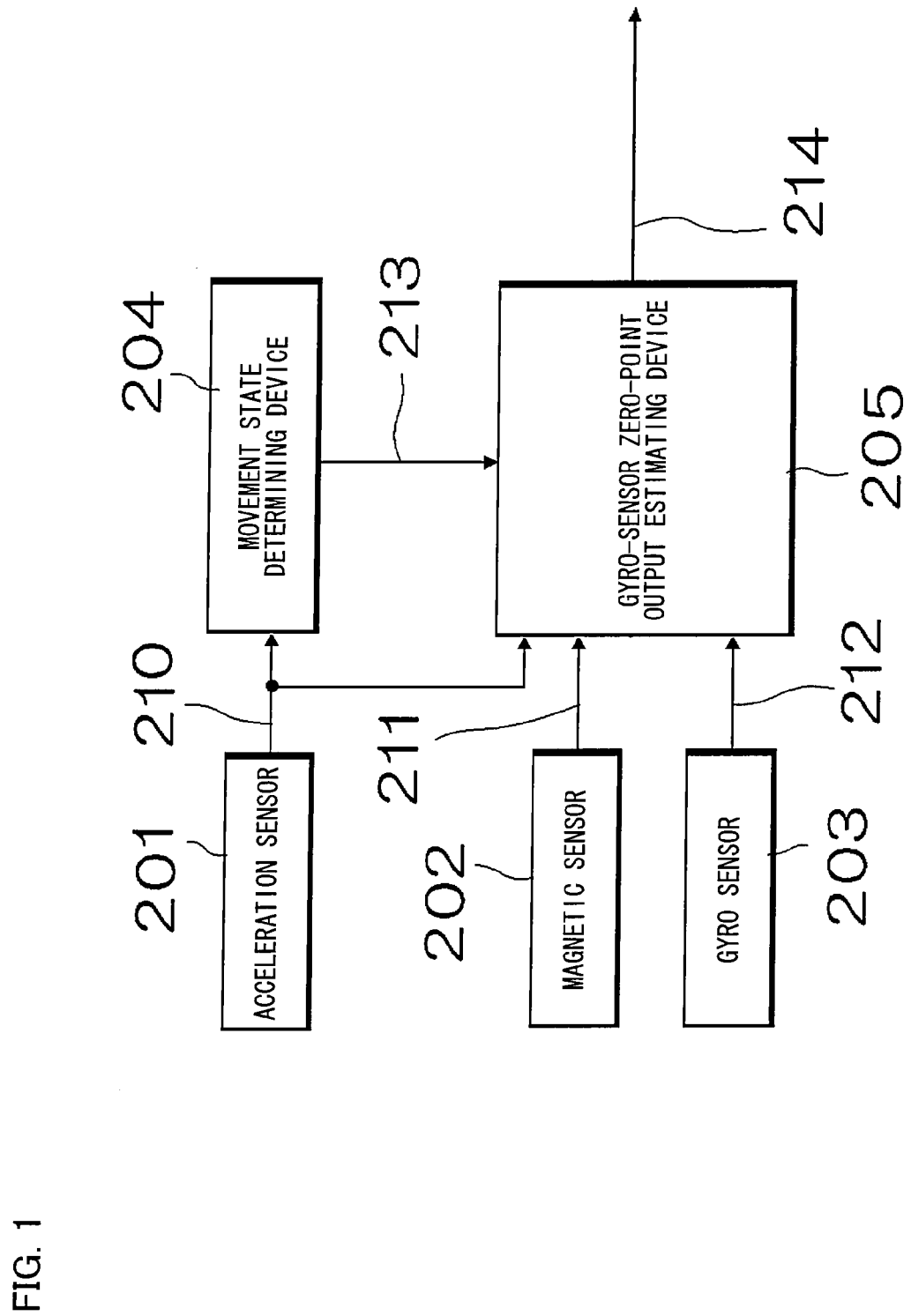
FIG. 1

A moving body attitude angle processing apparatus according to an embodiment of the present invention is described below in detail with reference to the drawings. FIG. 1 is a block diagram showing main components of a moving body attitude angle processing apparatus according to the present invention. As shown in FIG. 1, the moving body attitude angle processing apparatus includes: an acceleration sensor 201, which is used to detect an azimuth of gravitational force and a motion; a magnetic sensor 202, which measures geomagnetism and an ambient magnetic field; a gyro sensor 203, which measures an angular velocity; a movement state determining device 204; and a gyro-sensor zero-point output estimating device 205.

In the moving body attitude angle processing apparatus, the three-axis acceleration sensor 201, the three-axis magnetic sensor 202, and the three-axis gyro sensor 203, which are mounted to a moving body, serve as sensing means, and the movement state determining device 204 determines the presence or absence of a movement of the moving body in accordance with an acceleration vector 210 outputted from the acceleration sensor 201. This allows the movement state determining device 204 to determine whether the moving body is standing still. It should be noted here that an example of the technique by which the movement state determining device 204 determines a state of movement of the moving body to which these sensor are mounted is to calculate a variance in acceleration vector within a given period of time and, if the variance exceeds a predetermined threshold value, determine that the moving body is moving. Such a technique is effective when the moving body moves with vibrations that appear in an acceleration vector, e.g., in cases where the moving body is a pedestrian.

The movement state determining device 204 outputs a TRUE signal as an output signal 213 when a state of movement is detected. Alternatively, the movement state determining device 204 outputs a FALSE signal as an output signal 213 when a stationary state is detected. The gyro-sensor zero-point output estimating device 205 is embodied by an extended Kalman filter. This extended Kalman filter has a state vector whose components are a gravitational acceleration vector (three-axis), an ambient magnetic field vector (three-axis), an angular velocity vector (three-axis), and an offset value of zero-point output of angular velocity by the gyro sensor (three-axis). This allows the zero-point output (three-axis) of the gyro sensor to be estimated.

The state of the Kalman filter is updated by using as an observation of direction of gravitational force an acceleration vector 210 outputted from the acceleration sensor 201, using as an observation of ambient magnetic field vector a magnetic vector 211 outputted from the magnetic sensor 202, and using as an observation of angular velocity and zero-point output of the gyro sensor an angle velocity vector 212 outputted from the gyro sensor 203.

In cases where it is determined that the moving body is standing still, an ambient magnetic field that is measured by the magnetic sensor can be deemed to be constant at the same point. For this reason, when a plenty of observations are obtained, the state vector converges over time; and as a result of the convergence, the zero-point output of the gyro sensor can be acquired, which is then outputted as an estimate result 214 from the gyro-sensor zero-point output estimating device 205. The estimate result is utilized directly as data for correcting the zero point of the gyro sensor. Alternatively, the estimate result is utilized as a result for determining whether or not to use a result of estimation of the attitude angle of the moving body.

Figure 2:
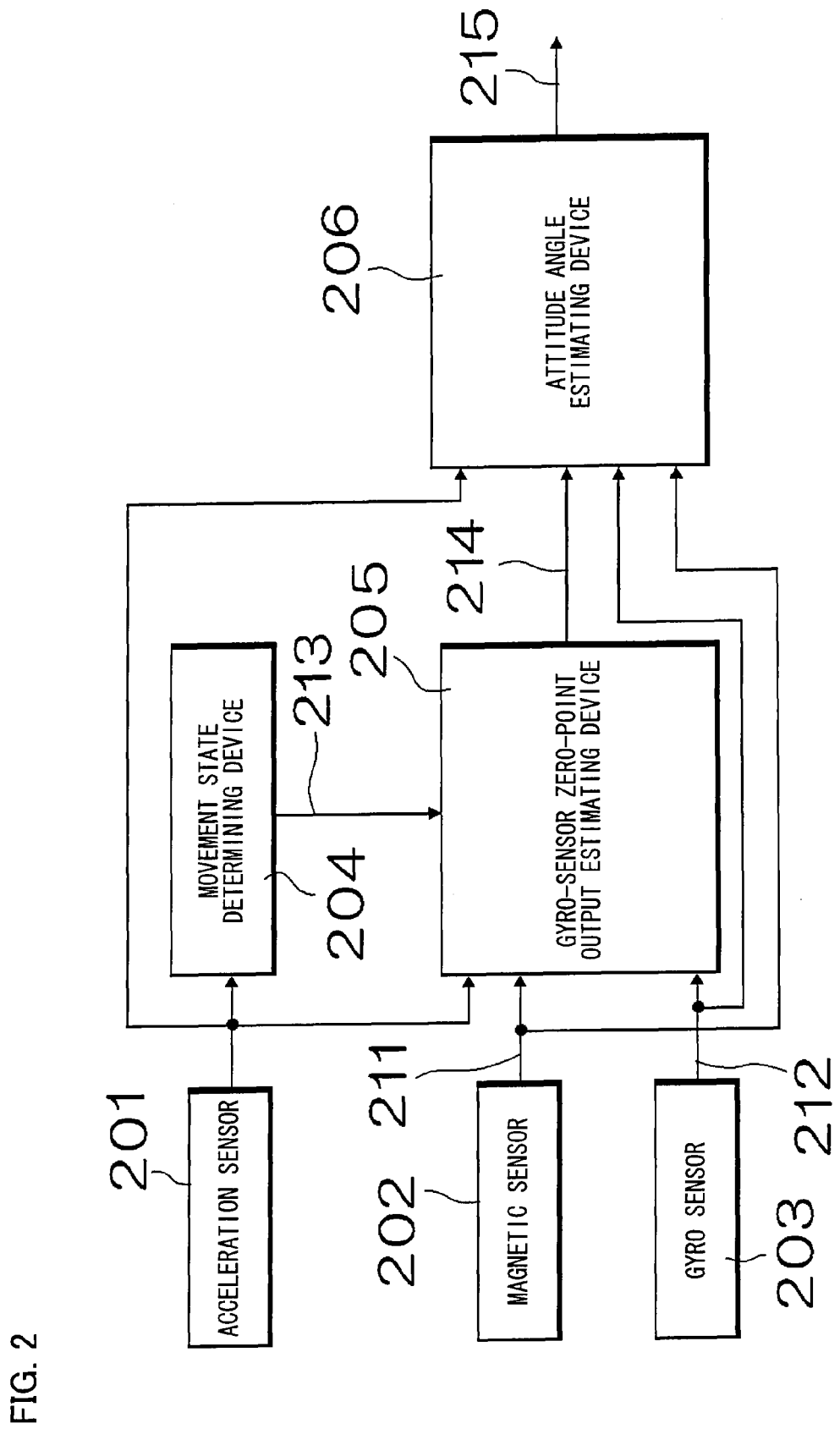
FIG. 2

FIG. 2 is a block diagram showing a configuration of a moving body attitude angle processing apparatus according to the present invention. As shown in FIG. 2, the moving body attitude angle processing apparatus includes an acceleration sensor 201, a magnetic sensor 202, a gyro sensor 203, a movement state determining device 204, a gyro-sensor zero-point output estimating device 205, and an attitude angle estimating device 206. In this configuration, output data from the acceleration sensor 201, output data from the magnetic sensor 202, and output data from the gyro sensor 203 are not only used for a process of estimation of a gyro sensor zero point but also utilized to carry out a process of estimation of an attitude angle in the attitude angle estimating device 206.

The attitude angle estimating device 206 receives output data, namely an acceleration vector 210, a magnetic vector 211, an angular velocity vector 212, and a gyro-sensor zero-point output 214. Specifically, the attitude angle estimating device 206 is embodied by a Kalman filter. A state vector containing nine components, namely a gravitational force direction vector (three-axis), a true north direction vector according to geomagnetism (three-axis), and an angular velocity vector (three-axis), is updated.

As an observation of gravitational force direction vector, an acceleration vector 210 is used. As an observation of true north direction vector, a true north vector obtained by correcting the angle of deviation and angle of depression of a magnetic vector 211 with respect to magnetic north is used. As an observation of angular velocity vector, an angular velocity vector obtained by correcting an angular velocity vector 112 with a zero-point output 214 is used. The attitude angle estimating device 206 calculates the attitude angle of the moving body with use of two vectors, namely the gravitational force direction vector and the true north direction vector, obtained here through the observations and the updating, and then outputs the attitude angle of the moving body (215).

Figure 3:
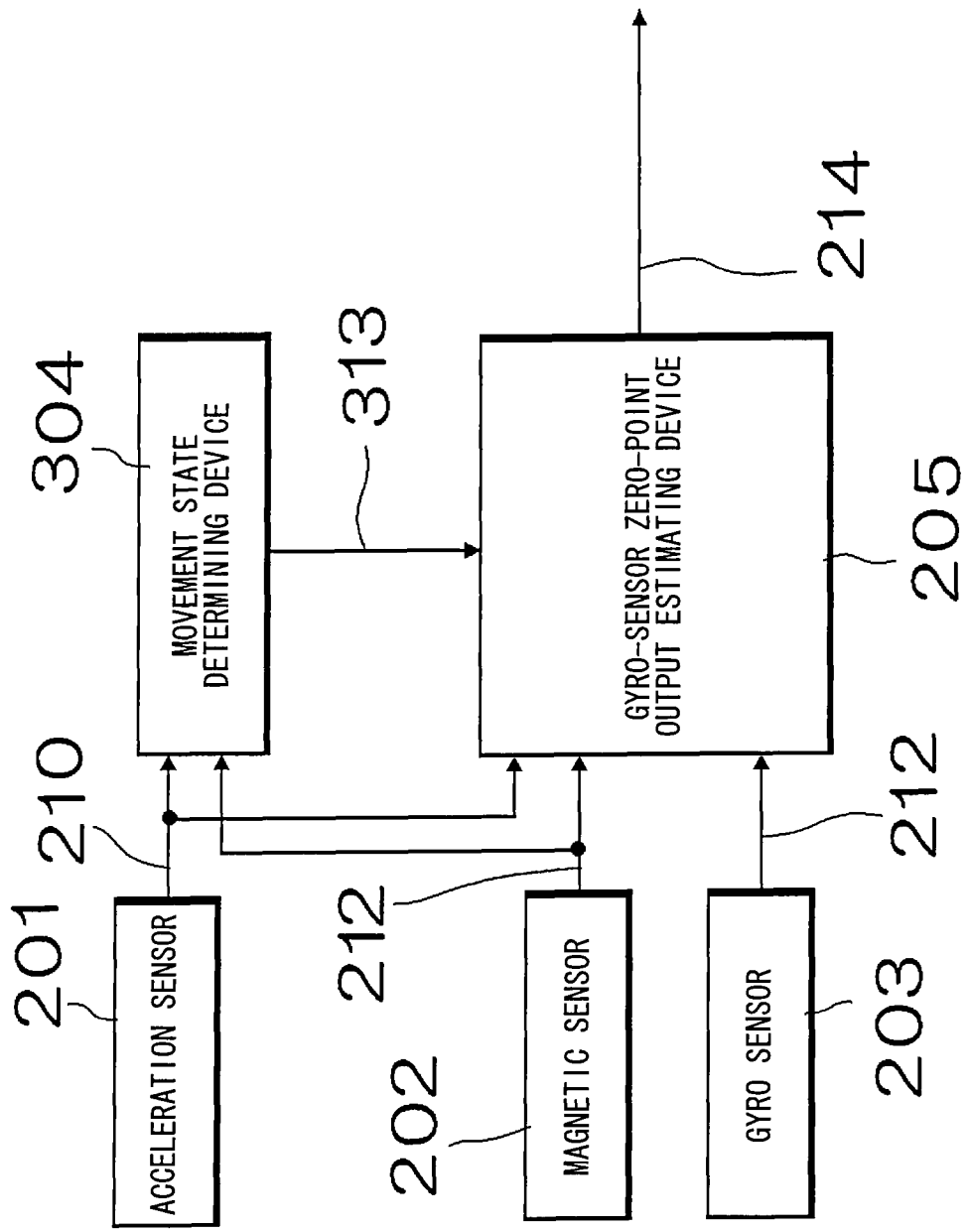
FIG. 3

FIG. 3 is a block diagram showing a configuration of another moving body attitude angle processing apparatus according to the present invention. The three-axis acceleration sensor 201, the three-axis magnetic sensor 202, and the three-axis gyro sensor 203, which are mounted to a moving body, serve as sensing means, and a movement state determining device 304 determines the presence or absence of a movement of the moving body in accordance with an acceleration vector 210 outputted from the acceleration sensor 201 and an angular velocity vector 212 outputted from the gyro sensor 203.

An example of means for determining a movement state is to calculate a variance in acceleration vector within a given period of time and, if the variance exceeds a predetermined threshold value or if the angular velocity vector exceeds a constant predetermined threshold value, determine that the moving body is moving. This is effective when the moving body moves with vibrations and rotational motions that appear in an acceleration vector and an angular velocity vector, e.g., in cases where the moving body is a pedestrian. The movement state determining device 304 outputs a TRUE signal as an output signal 313 when a state of movement is detected. Alternatively, the movement state determining device 304 outputs a FALSE signal as an output signal 313 when a stationary state is detected.

The gyro-sensor zero-point output estimating device 205 is embodied by a Kalman filter. This Kalman filter has a state vector whose components are a gravitational force direction vector (three-axis), an ambient magnetic field vector (three-axis), an angular velocity vector (three-axis), and an offset value of zero-point output of angular velocity by the gyro sensor (three-axis). The state of the Kalman filter is updated by using as an observation of direction of gravitational force an acceleration vector 210 outputted from the acceleration sensor 201, using as an observation of ambient magnetic field vector a magnetic vector 211 outputted from the magnetic sensor 202, and using as an observation of angular velocity and zero-point output of the gyro sensor an angle velocity vector 212 outputted from the gyro sensor 203.

When a plenty of observations are obtained, the state vector converges over time; and as a result of the convergence, the zero-point output of the gyro sensor can be acquired, which is then outputted as an estimate result from the gyro-sensor zero-point output estimating device 205 (214).

Figure 4:
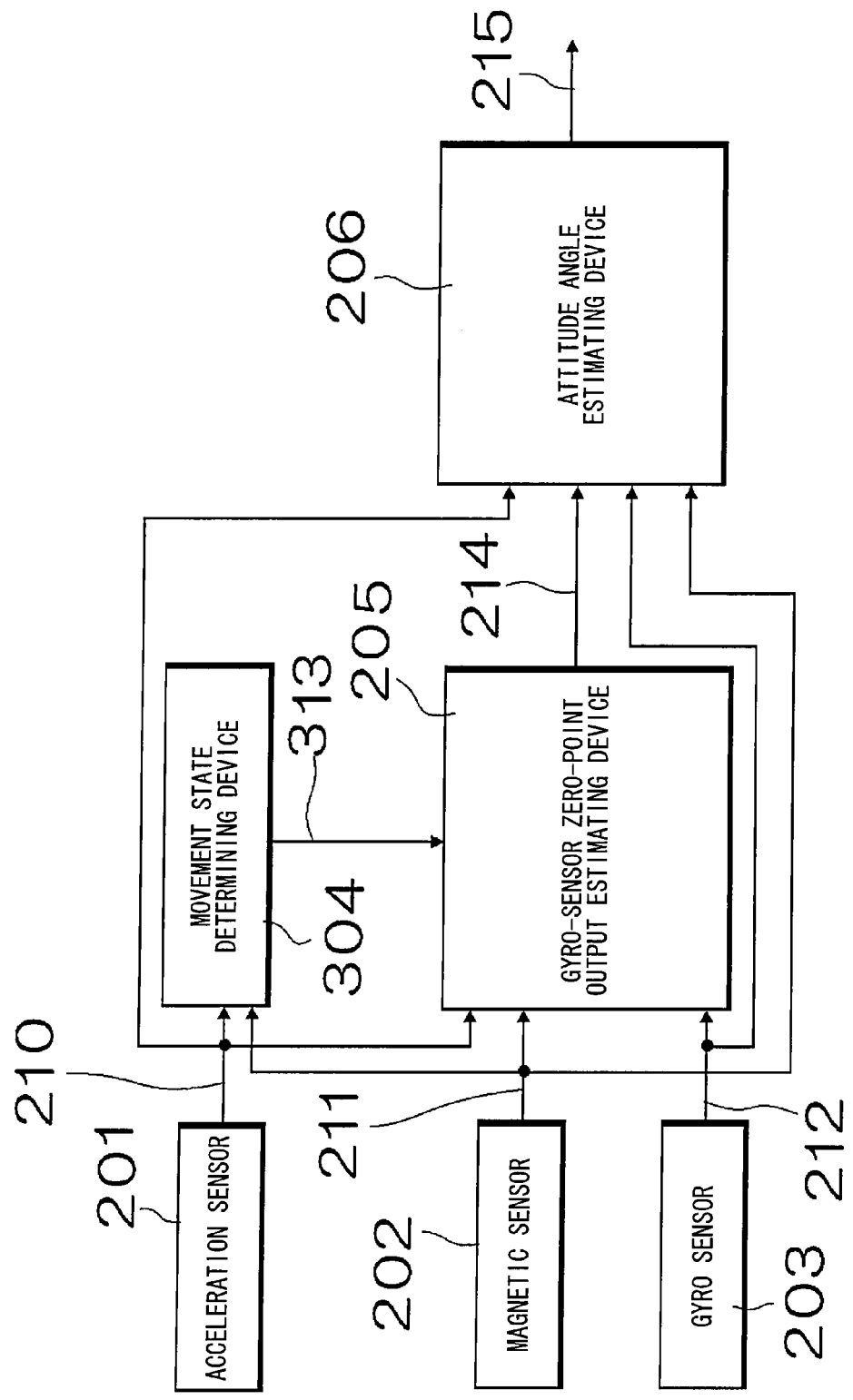
FIG. 4

FIG. 4 is a block diagram showing a configuration of another moving body attitude angle processing apparatus according to the present invention. The moving body attitude angle processing apparatus includes an attitude angle estimating device 206 in addition to the components of FIG. 3. The attitude angle estimating device 206 receives an acceleration vector 210, a magnetic vector 211, an angular velocity vector 212, a movement state flag 313, and a gyro-sensor zero-point output 214. The attitude angle estimating device 206 is embodied, for example, by a Kalman filter.

The Kalman filter has a state vector containing nine components, namely a gravitational force direction vector (three-axis), a true north direction vector (three-axis), and an angular velocity vector (three-axis). As an observation of gravitational force direction vector, an acceleration vector 210 is used. As an observation of true north direction vector, a true north vector obtained by correcting the angle of deviation and angle of depression of a magnetic vector 211 with respect to magnetic north is used. As an observation of angular velocity vector, an angular velocity vector obtained by correcting an angular velocity vector 212 with a zero-point output 214 is used. The attitude angle estimating device 206 calculates the attitude angle of the moving body with use of two vectors, namely the gravitational force direction vector and the true north direction vector, obtained here through the observations and the updating, and then outputs the attitude angle of the moving body (215).

REFERENCE SIGNS LIST

201 Acceleration sensor
202 Magnetic sensor
203 Gyro sensor
204 Movement state determining device
205 Gyro-sensor zero-point output estimating device
206 Attitude angle estimating device
304 Movement state determining device

The invention claimed is:

1. A moving body attitude angle processing apparatus for estimating an attitude angle of a moving body in accordance with outputs from an acceleration sensor, a magnetic sensor, and a gyro sensor that are mounted to the moving body, and for outputting the attitude angle thus estimated, the moving body attitude angle processing apparatus comprising:
a gyro sensor that outputs an angular velocity vector;
an acceleration sensor that outputs an acceleration vector;
a magnetic sensor that outputs a magnetic field vector of an ambient magnetic field that is different from a geomagnetic field;
a movement state determining device that determines a movement state of a moving body in accordance with an output from the acceleration sensor;
a gyro-sensor zero-point output estimating device that, when the movement state determining device determines the movement state to have been detected as a stationary state of the moving body, carries out a process of estimating a zero-point output of the gyro sensor in accordance with the output from the acceleration sensor, an output from the magnetic sensor, and an output from the gyro sensor, the gyro-sensor zero-point output estimating device is embodied by an extended Kalman filter having, as its components, only a gravitational acceleration vector, a magnetic field vector of the ambient magnetic field, an angular velocity vector, and an offset value of zero-point output of angular velocity by the gyro sensor,
a zero point of the gyro sensor being corrected by utilizing an output from the gyro-sensor zero-point output estimating device; and
an attitude angle estimating device that estimates the attitude angle in accordance with the outputs from the acceleration sensor, the magnetic sensor, and the gyro sensor.

2. The moving body attitude angle processing apparatus as set forth in claim 1, wherein the attitude angle estimating device corrects an output of estimation of an attitude angle of the moving body in accordance with the output from the gyro-sensor zero-point output estimating device.

3. A moving body attitude angle processing apparatus for estimating an attitude angle of a moving body in accordance with outputs from an acceleration sensor, a magnetic sensor, and a gyro sensor that are mounted to the moving body, and for outputting the attitude angle thus estimated, the moving body attitude angle processing apparatus comprising:
a gyro sensor that outputs an angular velocity vector;
an acceleration sensor that outputs an acceleration vector;
a magnetic sensor that outputs a magnetic field vector of an ambient magnetic field that is different from a geomagnetic field;
a movement state determining device that determines a movement state of a moving body in accordance with an output from the acceleration sensor and an output from the gyro sensor;
a gyro-sensor zero-point output estimating device that, when the movement state determining device determines the movement state to have been detected as a stationary state of the moving body, carries out a process of estimating a zero-point output of the gyro sensor in accordance with the output from the acceleration sensor, an output from the magnetic sensor, and the output from the gyro sensor, the gyro-sensor zero-point output estimating device is embodied by an extended Kalman filter having, as its components, only a gravitational acceleration vector, a magnetic field vector of the ambient magnetic field, an angular velocity vector, and an offset value of zero-point output of angular velocity by the gyro sensor,
a zero point of the gyro sensor being corrected by utilizing an output from the gyro-sensor zero-point output estimating device; and
an attitude angle estimating device that estimates the attitude angle in accordance with the outputs from the acceleration sensor, the magnetic sensor, and the gyro sensor.

4. The moving body attitude angle processing apparatus as set forth in claim 3, wherein the attitude angle estimating device corrects an output of estimation of an attitude angle of the moving body in accordance with the output from the gyro-sensor zero-point output estimating device.

* * * * *